(12) United States Patent
Kobayashi et al.

(10) Patent No.: US 11,299,067 B2
(45) Date of Patent: Apr. 12, 2022

(54) SEAT DEVICE

(71) Applicant: HONDA MOTOR CO., LTD., Tokyo (JP)

(72) Inventors: Satoshi Kobayashi, Wako (JP); Naotoshi Fujimoto, Wako (JP); Eika Takami, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 431 days.

(21) Appl. No.: 16/353,283

(22) Filed: Mar. 14, 2019

(65) Prior Publication Data

US 2019/0283629 A1   Sep. 19, 2019

(30) Foreign Application Priority Data

Mar. 15, 2018   (JP) .............................. JP2018-047514

(51) Int. Cl.
*B60N 2/02*     (2006.01)
*B60N 2/22*     (2006.01)
*B60N 2/06*     (2006.01)
*G05D 1/00*     (2006.01)

(52) U.S. Cl.
CPC ......... *B60N 2/0224* (2013.01); *B60N 2/0244* (2013.01); *B60N 2/22* (2013.01); *B60N 2/0232* (2013.01); *B60N 2/067* (2013.01); *B60N 2002/0268* (2013.01); *G05D 1/0061* (2013.01)

(58) Field of Classification Search
None
See application file for complete search history.

(56) References Cited

U.S. PATENT DOCUMENTS

| | | | | |
|---|---|---|---|---|
| 6,220,667 B1 * | 4/2001 | Wagner | ................. | B60N 2/002 |
| | | | | 297/284.6 |
| 6,578,917 B1 * | 6/2003 | Aubert | ................... | B60N 2/002 |
| | | | | 297/317 |
| 8,348,339 B2 | 1/2013 | Onuma et al. | | |
| 9,950,644 B2 | 4/2018 | Tominaga et al. | | |
| 9,994,125 B2 | 6/2018 | Magana et al. | | |
| 2010/0276973 A1 * | 11/2010 | Zenk | ...................... | B60N 2/914 |
| | | | | 297/284.3 |

(Continued)

FOREIGN PATENT DOCUMENTS

CN     101909932 A  * 12/2010  ............. B60N 2/002
CN     101909932 A    12/2010

(Continued)

OTHER PUBLICATIONS

Office Action and search report dated May 27, 2021 issued over the corresponding Chinese Patent Application No. 201910198399.1 with a partial English translation thereof.

(Continued)

*Primary Examiner* — Fadey S. Jabr
*Assistant Examiner* — Cole J Werley
(74) *Attorney, Agent, or Firm* — Carrier Blackman & Associates, P.C.; Joseph P. Carrier; Jeffrey T. Gedeon

(57) ABSTRACT

A first seat device includes a first pressure sensor attached to a seatback to detect pressure, a second pressure sensor attached to the seatback at a position below the first pressure sensor to detect pressure, and a control unit configured to control the angle of the seatback based on a value of the first pressure sensor and a value of the second pressure sensor.

8 Claims, 8 Drawing Sheets

(56) References Cited

U.S. PATENT DOCUMENTS

| | | | | |
|---|---|---|---|---|
| 2014/0319895 A1* | 10/2014 | Lange-Mao | .......... | B60R 21/015 |
| | | | | 297/463.1 |
| 2015/0203123 A1* | 7/2015 | Darnell | ............... | B60W 10/111 |
| | | | | 701/37 |
| 2016/0159251 A1* | 6/2016 | Ebina | ................... | B60N 2/0248 |
| | | | | 701/49 |
| 2017/0144568 A1* | 5/2017 | Torii | ....................... | B60N 2/767 |
| 2017/0361746 A1* | 12/2017 | Zouzal | .................... | B60N 2/914 |
| 2018/0065618 A1* | 3/2018 | Nishimine | .......... | B60W 30/182 |
| 2018/0297488 A1* | 10/2018 | Lem | ......................... | B60N 2/18 |
| 2019/0389330 A1* | 12/2019 | Yin | ....................... | A47C 31/126 |

FOREIGN PATENT DOCUMENTS

| | | | | | |
|---|---|---|---|---|---|
| CN | 205498662 | U | | 8/2016 | |
| CN | 106956619 | A | * | 7/2017 | .......... B60N 2/0244 |
| CN | 106956619 | A | | 7/2017 | |
| CN | 107020977 | A | * | 8/2017 | .......... B60N 2/0224 |
| CN | 107020977 | A | | 8/2017 | |
| CN | 207045164 | U | * | 2/2018 | |
| CN | 207045164 | U | | 2/2018 | |
| JP | 06286508 | A | * | 10/1994 | |
| JP | H06-286508 | A | | 10/1994 | |
| JP | 5252182 | B2 | * | 7/2013 | |
| JP | 5252182 | B2 | | 7/2013 | |

OTHER PUBLICATIONS

Office Action and search report dated Jan. 29, 2022 issued over the corresponding Chinese Patent Application No. 201910198399.1 with a partial English translation thereof.

* cited by examiner

SEAT DEVICE

CROSS-REFERENCE TO RELATED APPLICATION

This application is based upon and claims the benefit of priority from Japanese Patent Application No. 2018-047514 filed on Mar. 15, 2018, the contents of which are incorporated herein by reference.

BACKGROUND OF THE INVENTION

Field of the Invention

The present invention relates to a seat device at least with a reclining function of a seatback.

Description of the Related Art

A seat device described in Japanese Patent No. 5252182 is aimed at reliably operating a seatback in the next direction after the seatback is inclined to an operational end.

To achieve this, the seat device described in Japanese Patent No. 5252182 includes an information processing unit that, after a seatback is swung to the operational end through normal driving of an electric motor M by operating an inclination angle adjustment switch and then the seatback is operated in the opposite direction using the inclination angle adjustment switch, supplies a large amount of electric power to the electric motor M to perform a disengagement control.

SUMMARY OF THE INVENTION

However, the seat device described in Japanese Patent No. 5252182 disposes the inclination angle adjustment switch, which is manually operated, at a lower portion of a side of a seat cushion and therefore the inclination angle adjustment switch cannot be directly visually checked. Thus, an occupant may need to grope for the switch with their hands and adjust the seat position in an unstable manner. At this time, the occupant may operate the switch while turning their eyes on the switch. Some vehicles are provided with manual switches disposed on the doors to adjust the seat positions. However, also in this case, occupants need to adjust the seat positions blindly with their hands similarly to the above.

In this manner, the typical seat position adjustment is mainly done blindly with hands and is not intuitive.

The present invention has been devised taking into consideration the aforementioned problems, and has the object of providing a seat device allowing a user to intuitively and easily adjust the seat position by directly acting on the seatback.

According to an aspect of the present invention, a seat device including at least a seat cushion and a seatback comprises a first pressure sensor attached to the seatback to detect pressure, a second pressure sensor attached to the seatback at a position below the first pressure sensor to detect pressure, and control unit configured to control an angle of the seatback based on a value of the first pressure sensor and a value of the second pressure sensor.

In accordance with the seat device according to the present invention, the driver can intuitively and easily adjust the seat position by directly acting on the seatback.

The above and other objects features and advantages of the present invention will become more apparent from the following description when taken in conjunction with the accompanying drawings in which preferred embodiments of the present invention is shown by way of illustrative example.

DESCRIPTION OF THE PREFERRED EMBODIMENTS

Preferred embodiments of a seat device according to the present invention will be described in detail below with reference to FIGS. 1A to 8B.

First, a seat device according to a first embodiment (hereinafter referred to as "first seat device 10A") will be described with reference to FIGS. 1A to 4.

Figure 1B:
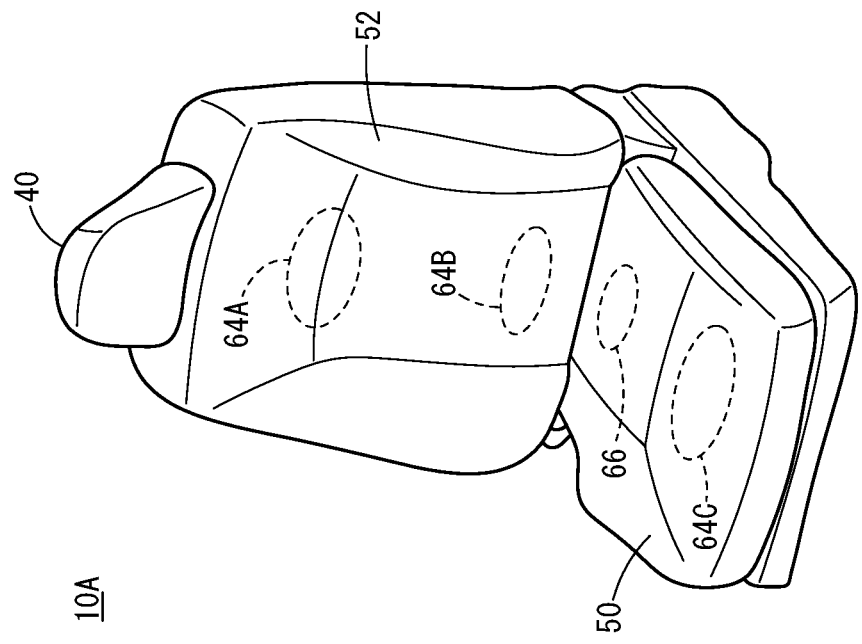
FIG. 1B is a perspective view illustrating the appearance of the first seat device and an example arrangement of various pressure sensors.
Figure 1A:
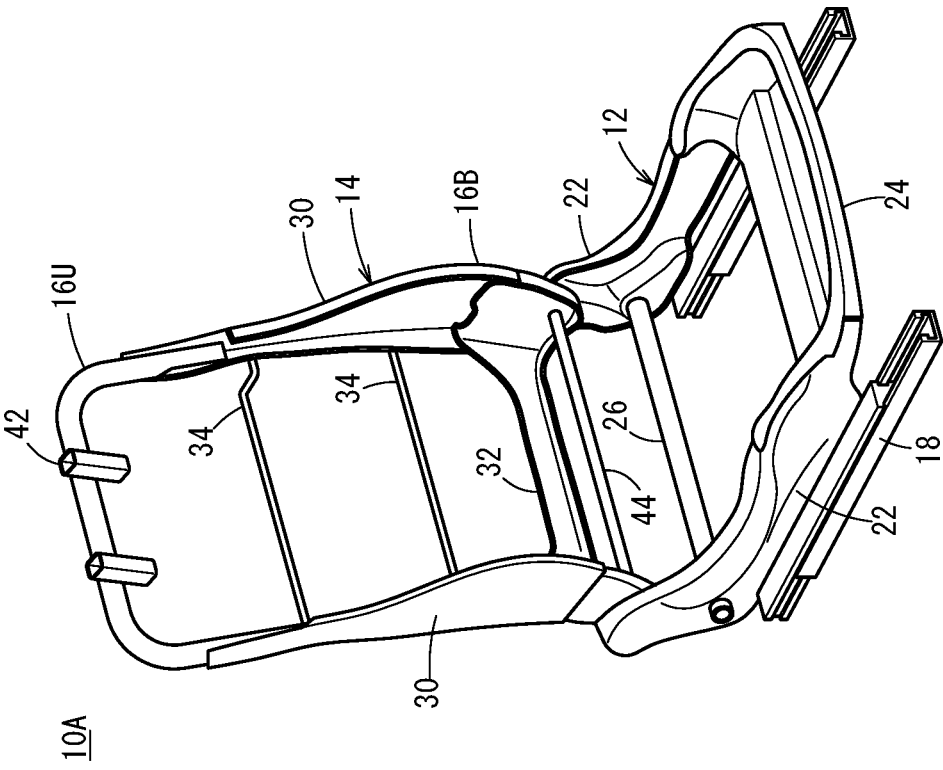
FIG. 1A is a perspective view illustrating a frame structure of a seat device (first seat device) according to a first embodiment.

As illustrated in FIG. 1A, the first seat device 10A includes at least a seat cushion frame 12 and a seatback frame 14. The seatback frame 14 includes a lower seatback frame 16B rotatably attached to the seat cushion frame 12 and an upper seatback frame 16U secured to an upper portion of the lower seatback frame 16B by welding or the like.

The first seat device 10A is mounted on the floor or the like of transport equipment such as vehicles, ships, and aircrafts by brackets 18 to be, for example, slidable back and forth. The first seat device 10A may be secured onto the floor or the like instead of being slidable.

The seat cushion frame 12 has a frame shape formed of, for example, a pair of left and right cushion side frames 22 extending in the front-back direction, a front frame 24 spanning between front portions of the cushion side frames 22, and a rear frame 26 spanning between rear portions of the cushion side frames 22. The brackets 18 are attached to the respective cushion side frames 22.

The lower seatback frame 16B has a frame shape formed of a pair of left and right back side frames 30 extending substantially vertically, a lower back frame 32 spanning between lower end portions of the left and right back side frames 30, and reinforcing poles 34 spanning between upper portions and between lower portions of the back side frames 30. The lower back frame 32 is joined to the lower end portions of the back side frames 30 by, for example, welding.

The upper seatback frame 16U has an inverted U shape. Both end portions of the upper seatback frame 16U are joined to upper portions of the lower seatback frame 16B by, for example, welding. Two cylindrical holders 42, into which stays (not illustrated) for a headrest 40 (see FIG. 1B) are to be inserted, are secured to a central portion of the upper seatback frame 16U.

A support shaft 44 is disposed at a rear portion of the seat cushion frame 12 and a lower portion of the lower seatback frame 16B. The lower seatback frame 16B is supported by the support shaft 44 to be rotatable with respect to the seat cushion frame 12. For example, the lower portion of the lower seatback frame 16B is rotatably connected to the inner sides of the rear portions of the cushion side frames 22.

As illustrated in FIG. 1B, a seat cushion 50 is produced by covering the seat cushion frame 12 with pads and an outer cover, and a seatback 52 is produced by covering the lower seatback frame 16B and the upper seatback frame 16U with pads and an outer cover.

Figure 2:
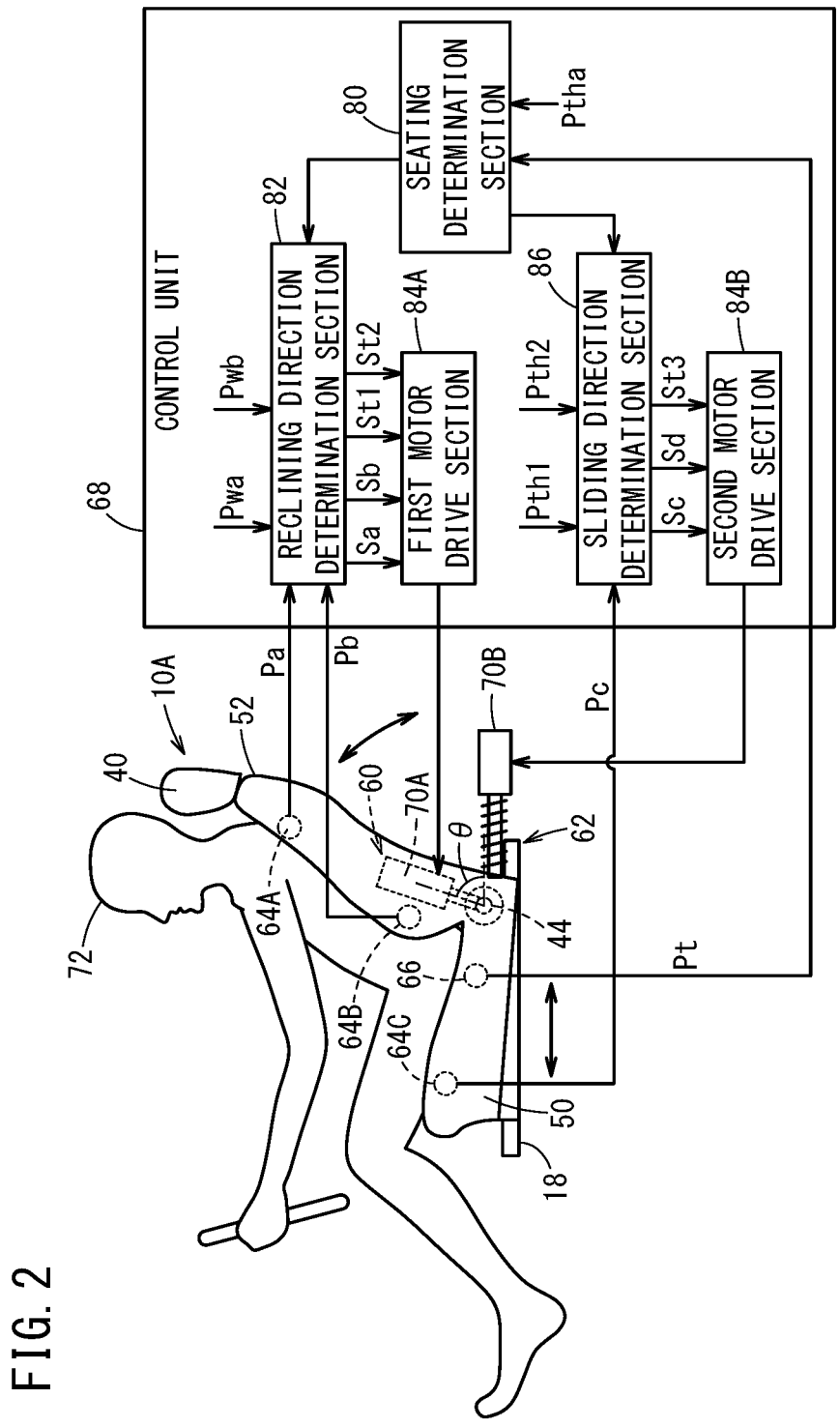
FIG. 2 is a block diagram illustrating an example configuration of a control unit of the first seat device.

As illustrated in FIG. 2, the first seat device 10A further includes a seat reclining mechanism 60, a seat sliding mechanism 62, a first pressure sensor 64A and a second pressure sensor 64B embedded in the seatback 52, a third pressure sensor 64C and a seating sensor 66 embedded in the seat cushion 50, and a control unit 68.

The seat reclining mechanism 60 includes a first drive motor 70A. The first drive motor 70A drives the lower seatback frame 16B (see FIG. 1A) to rotate about the support shaft 44 according to the control unit 68. This causes the seatback 52 to rotate back and forth about the support shaft 44.

The seat sliding mechanism 62 includes a second drive motor 70B. The second drive motor 70B controls the seat cushion frame 12 (see FIG. 1A) to move back and forth along the brackets 18 according to the control unit 68. This causes the seat cushion 50 to slide back and forth.

The first pressure sensor 64A and the second pressure sensor 64B are disposed inside the seatback 52, and the third pressure sensor 64C and the seating sensor 66 are disposed inside the seat cushion 50. For example, when a driver 72 is seated in the first seat device 10A, the first pressure sensor 64A opposes an upper portion of the back of the driver 72, and the second pressure sensor 64B opposes a lower portion of the back of the driver 72. The third pressure sensor 64C opposes, for example, legs (mainly the backs of the thighs) of the driver 72 seated on the seat cushion 50. The seating sensor 66 opposes, for example, the buttocks or the vicinity of the bases of the thighs of the driver 72 seated on the seat cushion 50.

The control unit 68 includes a seating determination section 80, a reclining direction determination section 82, a first motor drive section 84A, a second motor drive section 84B, and a sliding direction determination section 86.

The seating determination section 80 determines whether the driver 72 is seated on the seat cushion 50 based on a value Pt of the seating sensor 66. For example, it is determined that the driver 72 is seated on the seat cushion 50 when the value Pt of the seating sensor 66 is greater than a predetermined seating threshold Ptha. As the seating threshold Ptha, there may be used the minimum value, or 1/n of the minimum value, the maximum value, or the mean value, of the pressures detected in advance when a plurality of people are seated one by one. Any other numerical values enabling detection of a person having been seated may be used.

The control unit 68 may execute processing operations performed by the reclining direction determination section 82 and the sliding direction determination section 86 when the seating determination section 80 determines that the driver 72 is seated.

The reclining direction determination section 82 determines a direction along which the first drive motor 70A is to be rotated based on a value Pa of the first pressure sensor 64A and a value Pb of the second pressure sensor 64B, and outputs the determination result to the first motor drive section 84A. To compare the value Pa of the first pressure sensor 64A with the value Pb of the second pressure sensor 64B, for example, a predetermined first threshold band Pwa (pressure value) and a predetermined second threshold band Pwb (pressure value) are set.

When the value Pa of the first pressure sensor 64A is greater than the value Pb of the second pressure sensor 64B and the difference ΔPab (absolute value) between the value Pa of the first pressure sensor 64A and the value Pb of the second pressure sensor 64B is greater than or equal to the first threshold band Pwa, the reclining direction determination section 82 outputs to the first motor drive section 84A a first determination signal Sa for rotating the first drive motor 70A in, for example, a normal direction.

Conversely, when the value Pa of the first pressure sensor 64A is less than the value Pb of the second pressure sensor 64B and the above-described difference ΔPab is greater than or equal to the second threshold band Pwb, the reclining direction determination section 82 outputs to the first motor drive section 84A a second determination signal Sb for rotating the first drive motor 70A in, for example, a reverse direction.

The first motor drive section 84A drives the first drive motor 70A to rotate in the normal direction based on the input of the first determination signal Sa from the reclining direction determination section 82. This causes the seatback 52 to rotate about the support shaft 44 to recline backward. Conversely, the first motor drive section 84A drives the first drive motor 70A to rotate in the reverse direction when the second determination signal Sb is input from the reclining direction determination section 82. This causes the seatback 52 to rotate about the support shaft 44 to be raised forward.

Moreover, the reclining direction determination section 82 outputs a first stop signal St1 to the first motor drive section 84A at a point in time when the above-described difference ΔPab becomes less than the first threshold band Pwa, and outputs a second stop signal St2 to the first motor drive section 84A at a point in time when the above-described difference ΔPab becomes less than the second threshold band Pwb. The first motor drive section 84A stops the rotation of the first drive motor 70A based on the input of the first stop signal St1 or the second stop signal St2.

Setting the first threshold band Pwa and the second threshold band Pwb prevents even a slight movement of the driver 72 from activating the seat position adjustment. The first threshold band Pwa and the second threshold band Pwb may be identical to or different from each other. As a matter of course, the first threshold band Pwa and the second threshold band Pwb may be set as appropriate depending on the type and the like of the first seat device 10A.

On the other hand, the sliding direction determination section 86 determines a direction along which the second drive motor 70B is to be rotated based on a value Pc of the third pressure sensor 64C, a first threshold Pth1, and a second threshold Pth2 (<Pth1), and outputs the determination result to the second motor drive section 84B.

For example, when the value Pc of the third pressure sensor 64C is greater than the first threshold Pth1, the sliding direction determination section 86 outputs to the second motor drive section 84B a third determination signal Sc for rotating the second drive motor 70B in, for example, a normal direction.

Conversely, when the value Pc of the third pressure sensor 64C is less than the second threshold Pth2, the sliding direction determination section 86 outputs to the second motor drive section 84B a fourth determination signal Sd for rotating the second drive motor 70B in, for example, a reverse direction.

The second motor drive section 84B drives the second drive motor 70B to rotate in the normal direction based on the input of the third determination signal Sc from the sliding direction determination section 86. This causes the seat cushion 50 to slide backward along the brackets 18. Conversely, the second motor drive section 84B drives the second drive motor 70B to rotate in the reverse direction when the fourth determination signal Sd is input from the sliding direction determination section 86. This causes the seat cushion 50 to slide forward along the brackets 18.

Moreover, the sliding direction determination section 86 outputs a third stop signal St3 to the second motor drive section 84B at a point in time when the value Pc of the third pressure sensor 64C becomes greater than or equal to the second threshold Pth2 and less than or equal to the first threshold Pth1. The second motor drive section 84B stops the rotation of the second drive motor 70B based on the input of the third stop signal St3.

Setting the first threshold Pth1 and the second threshold Pth2 prevents even a slight movement of the driver 72 from activating the adjustment by the seat sliding mechanism 62. The first threshold Pth1 and the second threshold Pth2 may be identical to or different from each other. As a matter of course, the first threshold Pth1 and the second threshold Pth2 may be set as appropriate depending on the type and the like of the first seat device 10A.

A processing operation of the first seat device 10A, in particular, reclining adjustment of the seatback 52 will now be described with reference to a flowchart in FIG. 3.

Figure 3:
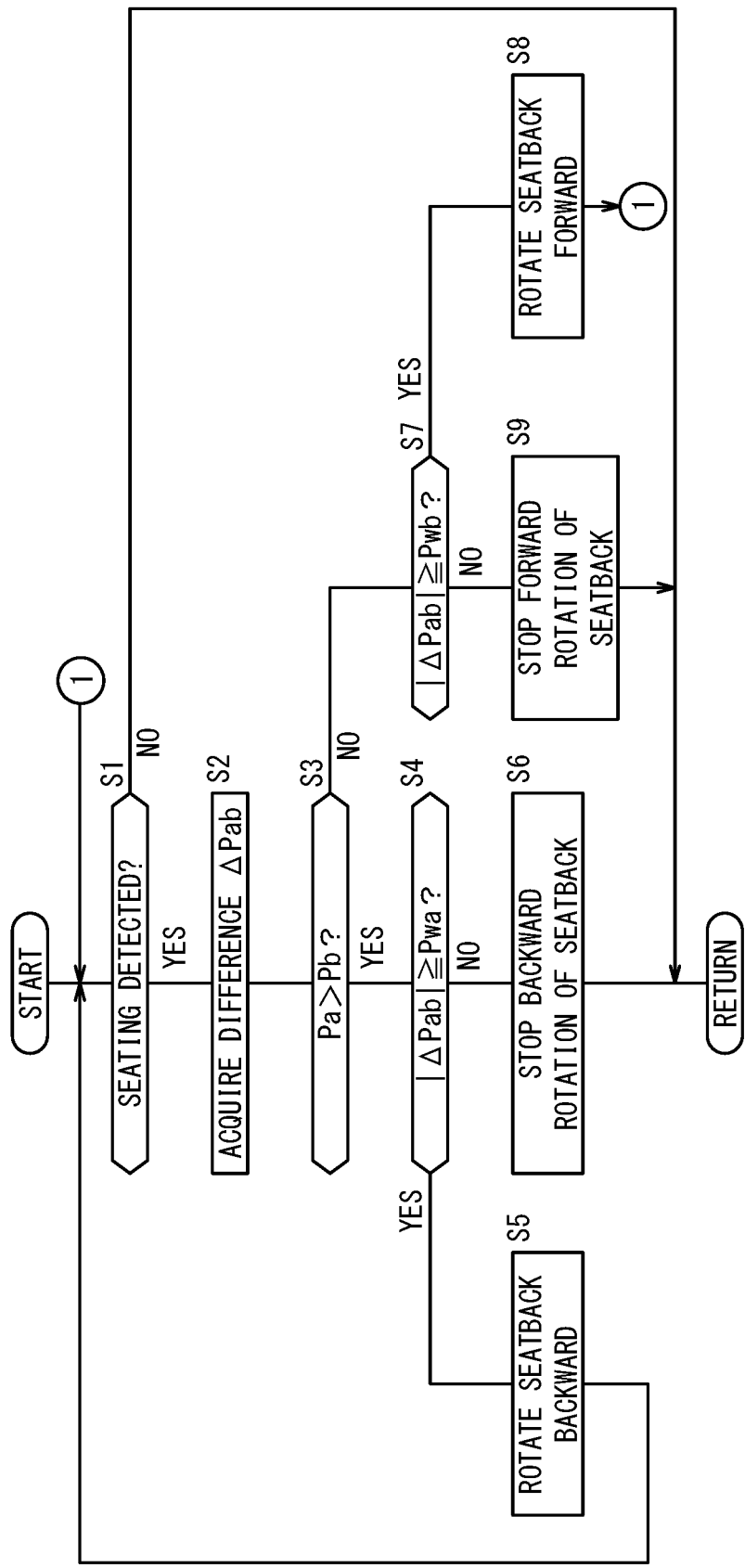
FIG. 3 is a flowchart illustrating an example reclining adjustment of a seatback serving as a processing operation of the first seat device.

First, in step S1 in FIG. 3, the seating determination section 80 detects whether the driver 72 is seated on the seat cushion 50. As the detection, it is determined whether the value Pt of the seating sensor 66 is greater than the predetermined seating threshold Ptha.

If the value Pt of the seating sensor 66 is greater than the seating threshold Ptha, the seating determination section 80 detects that the driver 72 is seated (YES in step S1), and the process proceeds to step S2. In step S2, the reclining direction determination section 82 acquires the difference ΔPab between the value Pa of the first pressure sensor 64A and the value Pb of the second pressure sensor 64B.

Next, in step S3, the reclining direction determination section 82 determines whether the value Pa of the first pressure sensor 64A is greater than the value Pb of the second pressure sensor 64B. If the value Pa is greater than value Pb (YES in step S3), the process proceeds to step S4, and the reclining direction determination section 82 determines whether the driver 72 is requesting reclining adjustment to recline the seatback 52 backward. To do this, it is determined whether the difference ΔPab (absolute value) is greater than or equal to the first threshold band Pwa.

If the above-described difference ΔPab (absolute value) is greater than or equal to the first threshold band Pwa (YES in step S4), the process proceeds to step S5, and the reclining direction determination section 82 outputs the first determination signal Sa for rotating the first drive motor 70A in, for example, the normal direction to the first motor drive section 84A. This causes the seatback 52 to rotate about the support shaft 44 to recline backward.

Then the seatback 52 leans backward by repeating the process from step S1. When the difference ΔPab (absolute value) becomes less than the first threshold band Pwa in step S4, the process proceeds to step S6, and the reclining direction determination section 82 outputs the first stop signal St1 to the first motor drive section 84A. This stops the backward rotation of the seatback 52.

On the other hand, if it is determined that the value Pa of the first pressure sensor 64A is not greater than value Pb of the second pressure sensor 64B in step S3, the process proceeds to step S7, and the reclining direction determination section 82 determines whether the driver 72 is requesting reclining adjustment to tilt the seatback 52 forward. To do this, it is determined whether the difference ΔPab (absolute value) is greater than or equal to the second threshold band Pwb.

If the above-described difference ΔPab (absolute value) is greater than or equal to the second threshold band Pwb, the process proceeds to step S8, and the reclining direction determination section 82 outputs the second determination signal Sb for rotating the first drive motor 70A in, for example, the reverse direction to the first motor drive section 84A. This causes the seatback 52 to rotate about the support shaft 44 forward.

Then the seatback 52 rises forward by repeating the process from step S1. When the difference ΔPab (absolute value) becomes less than the second threshold band Pwb in step S7, the process proceeds to step S9, and the reclining direction determination section 82 outputs the second stop signal St2 to the first motor drive section 84A. This stops the forward rotation of the seatback 52.

When the process is completed in step S6 or S8 or, if the driver 72 is not detected to be seated in step S1, the process is repeated from step S1 after a predetermined period of time has passed.

Next, a processing operation of the first seat device 10A, in particular, sliding adjustment of the seat cushion 50 will be described with reference to a flowchart in FIG. 4.

Figure 4:
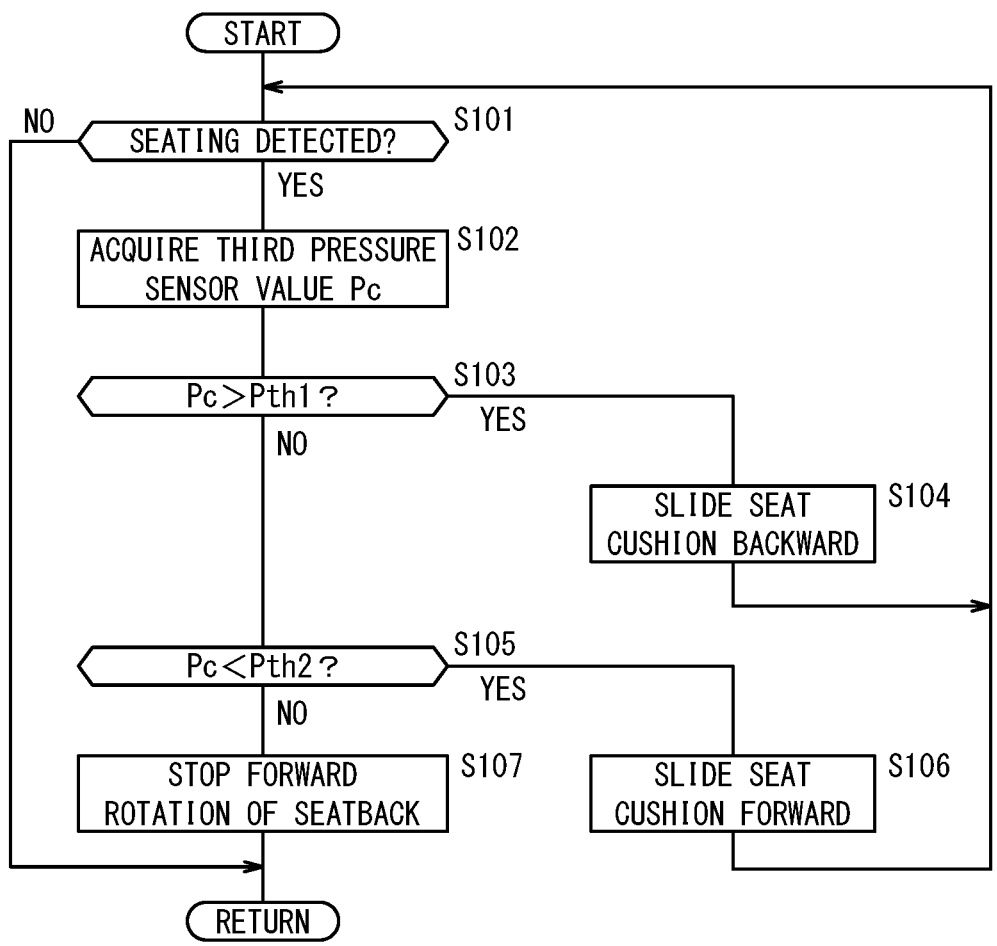
FIG. 4 is a flowchart illustrating an example sliding adjustment of a seat cushion serving as another processing operation of the first seat device.

First, in step S101 in FIG. 4, the seating determination section 80 detects whether the driver 72 is seated on the seat cushion 50. That is, if the value Pt of the seating sensor 66 is greater than the seating threshold Ptha, the seating determination section 80 detects that the driver 72 is seated (YES in step S101), and the process proceeds to step S102. In step S102, the sliding direction determination section 86 acquires the value Pc of the third pressure sensor 64C.

In step S103, the sliding direction determination section 86 determines whether the driver 72 is requesting sliding adjustment to move the seat cushion 50 backward. To do this, it is determined whether the value Pc of the third pressure sensor 64C is greater than the first threshold Pth1. If the value Pc of the third pressure sensor 64C is greater than the first threshold Pth1 (YES in step S103), the process proceeds to step S104, and the sliding direction determination section 86 outputs the third determination signal Sc for rotating the second drive motor 70B in, for example, the normal direction to the second motor drive section 84B. This causes the seat cushion 50 to slide backward along the brackets 18. Following this, the process from step S101 is repeated.

On the other hand, if it is determined that the value Pc of the third pressure sensor 64C is not greater than first threshold Pth1 in step S103, the process proceeds to step S105, and the sliding direction determination section 86 determines whether the driver 72 is requesting sliding adjustment to move the seat cushion 50 forward. To do this, it is determined whether the value Pc of the third pressure sensor 64C is less than the second threshold Pth2. If the value Pc of the third pressure sensor 64C is less than the second threshold Pth2, the process proceeds to step S106, and the sliding direction determination section 86 outputs the fourth determination signal Sd for rotating the second drive motor 70B in, for example, the reverse direction to the second motor drive section 84B. This causes the seat cushion 50 to slide forward along the brackets 18. Following this, the process is repeated from step S101.

If it is determined that the value Pc of the third pressure sensor 64C is not less than second threshold Pth2 in step S105, that is, if the value Pc of the third pressure sensor 64C is greater than or equal to the second threshold Pth2 and less than or equal to the first threshold Pth1, it is determined that the driver 72 is not requesting sliding adjustment of the seat cushion 50, and the sliding direction determination section 86 outputs the third stop signal St3 to the second motor drive section 84B. This causes the seat cushion 50 to stop sliding. Following this, the process is repeated from step S101 after a predetermined period of time has passed.

Next, a seat device according to a second embodiment (hereinafter referred to as "second seat device 10B") will be described with reference to FIGS. 5 to 7.

Figure 5:
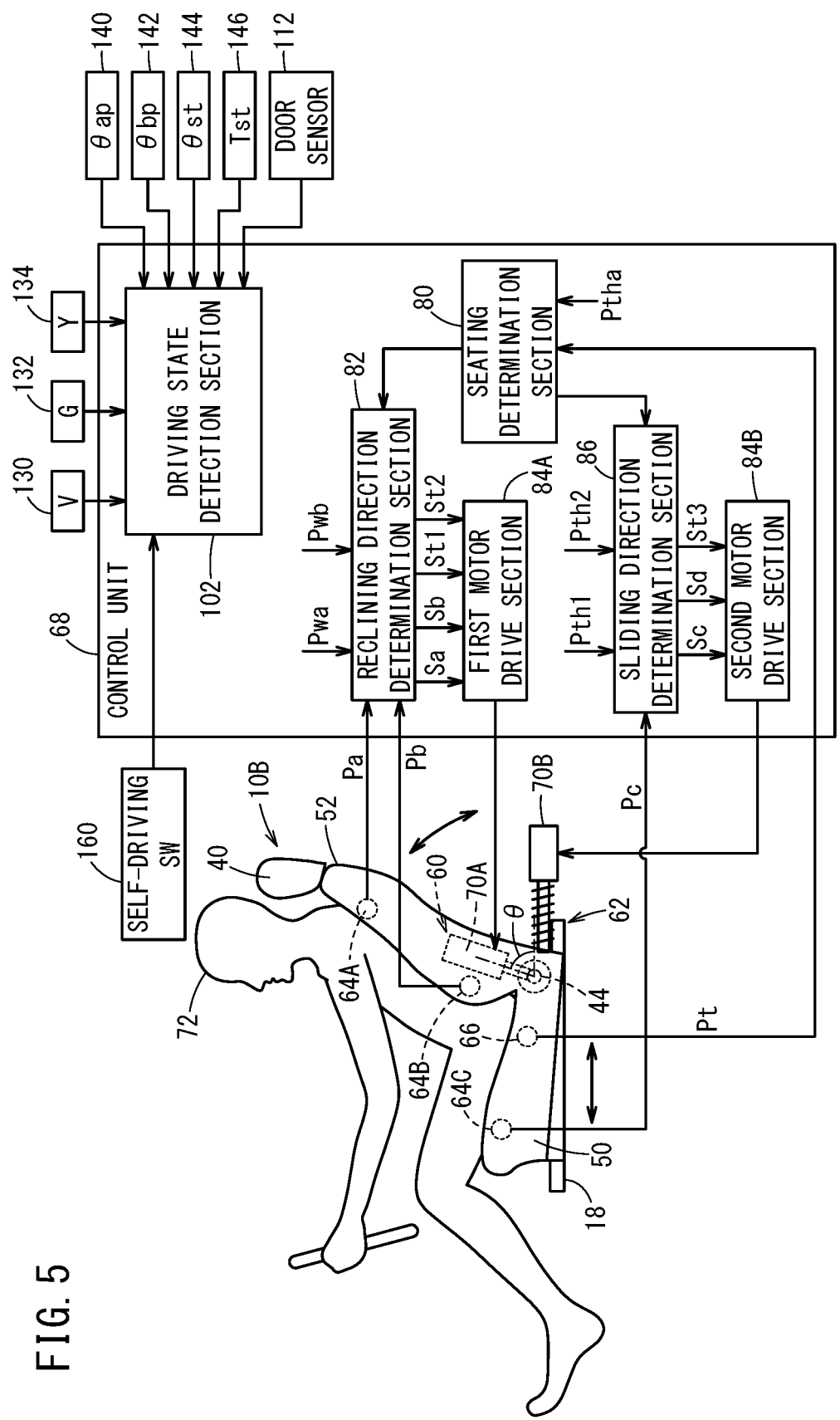
FIG. 5 is a block diagram illustrating an example configuration of a control unit of a second seat device.

As illustrated in FIG. 5, the second seat device 10B has a configuration similar to the configuration of the above-described first seat device 10A except that the second seat device 10B includes a driving state detection section 102 configured to detect the driving state of a vehicle 100 (see FIG. 6) in which the second seat device 10B is installed and that the reclining direction determination section 82 operates in response to detection results obtained by the driving state detection section 102.

Figure 6:
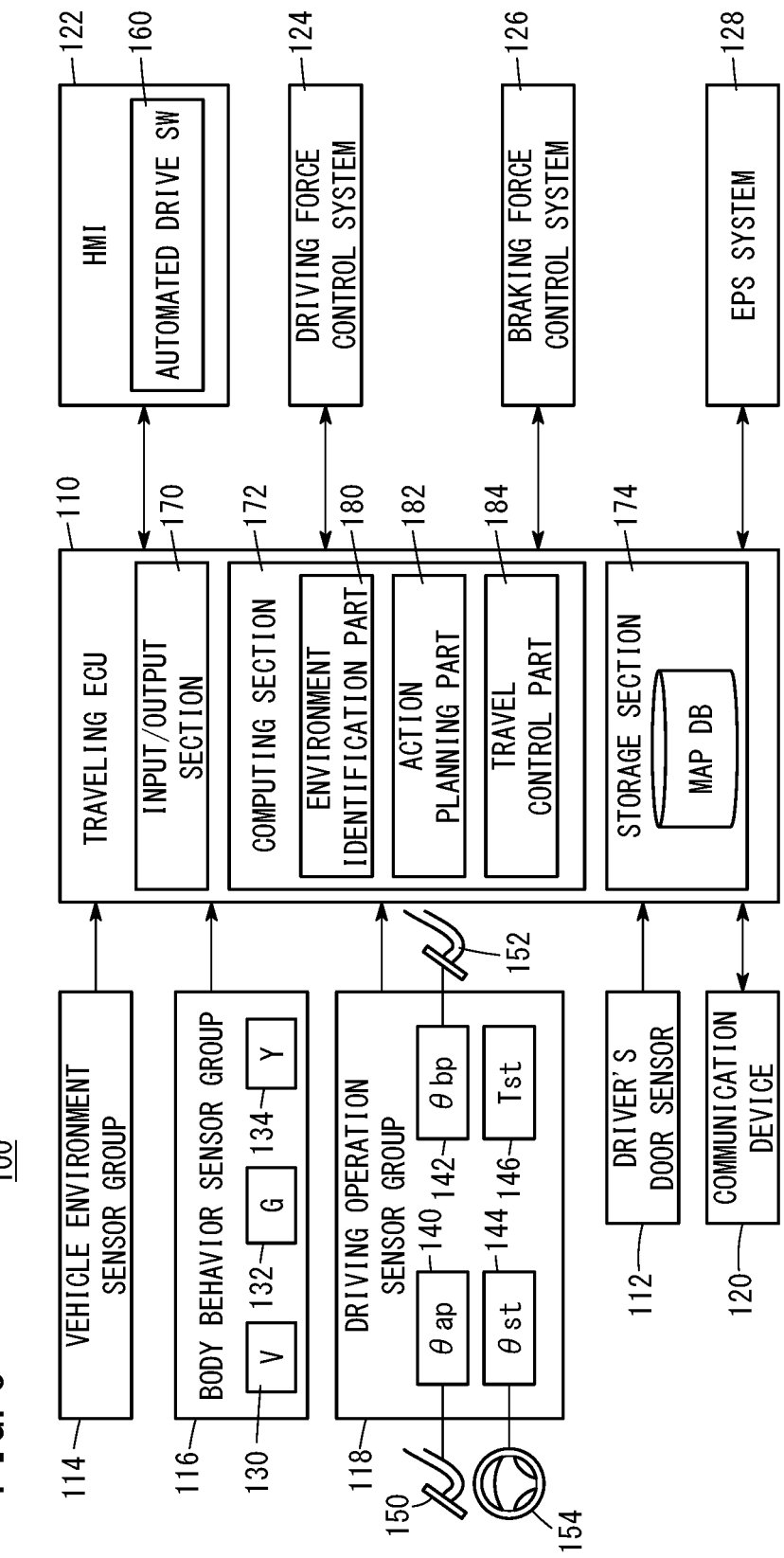
FIG. 6 is a block diagram illustrating an example configuration of a vehicle in which the second seat device is installed.

As illustrated in FIG. 6, the vehicle 100 in which the second seat device 10B is installed includes, for example, a traveling ECU 110, a driver's door sensor 112, a vehicle environment sensor group 114, a body behavior sensor group 116, a driving operation sensor group 118, a communication device 120, a human-machine interface 122 (hereinafter referred to as "HMI 122"), a driving force control system 124, a braking force control system 126, and an electric power steering system 128 (hereinafter referred to as "EPS system 128").

The vehicle environment sensor group 114 detects information about the environment around the vehicle 100. Although not illustrated, the vehicle environment sensor group 114 includes a plurality of external cameras, a plurality of radars, a light detection and ranging (LIDAR) system, and a global positioning system sensor (GPS sensor).

The body behavior sensor group 116 detects information about behaviors of the vehicle 100 (body behavior information). The body behavior sensor group 116 includes a vehicle speed sensor 130, an accelerometer 132, and a yaw rate sensor 134.

The vehicle speed sensor 130 detects the vehicle speed V [km/h] and the direction of travel of the vehicle 100. The accelerometer 132 detects the acceleration G [m/s$^2$] of the vehicle 100. The acceleration G includes the longitudinal acceleration α, the lateral acceleration Glat, and the vertical acceleration Gv. The yaw rate sensor 134 detects the yaw rate Y [rad/s] of the vehicle 100.

The driving operation sensor group 118 detects information about driving operations by a driver (driving operation information). The driving operation sensor group 118 includes an accelerator pedal sensor 140, a brake pedal sensor 142, a steering angle sensor 144, and a steering torque sensor 146.

The accelerator pedal sensor 140 (AP sensor 140) detects an operational amount θap [%] to an accelerator pedal 150 (AP operational amount θap). The brake pedal sensor 142 (BP sensor 142) detects an operational amount θbp [%] to a brake pedal 152 (BP operational amount θbp). The steering angle sensor 144 detects the steering angle θst [deg] of a steering wheel 154.

The communication device 120 communicates with external devices wirelessly. The external devices here include external servers (not illustrated). The external servers may be, for example, weather information servers, traffic information servers, or route servers.

The HMI 122 receives operational inputs from an occupant and gives visual, audible, and tactile presentations of various types of information to the occupant. The HMI 122 includes an automated drive switch 160 (automated drive SW 160) and a speaker and a display (both not illustrated).

The occupant operates the automated drive SW 160 to issue commands for starting automated drive control and ending the automated drive control (starting manual drive). Instead of or in addition to the automated drive SW 160, the commands for starting and ending the automated drive control may be issued using other methods (for example, voice input through a microphone, which is not illustrated).

The driving force control system 124 includes an engine and an electronic control unit for driving (driving ECU), both of which are not illustrated. The AP sensor 140 and the accelerator pedal 150 described above may be regarded as part of the driving force control system 124. The driving ECU controls the driving force of the vehicle 100 using the AP operational amount θap and the like. The driving ECU controls the driving force of the vehicle 100 by controlling the engine.

The braking force control system 126 includes a brake mechanism and an electronic control unit for braking (braking ECU), both of which are not illustrated. The BP sensor 142 and the brake pedal 152 described above may be regarded as part of the braking force control system 126. The brake mechanism activates brake members using a brake motor (or a hydraulic mechanism) and the like. The braking ECU controls the braking force of the vehicle 100 using the BP operational amount θbp and the like. The braking ECU controls the braking force of the vehicle 100 by controlling the brake mechanism and the like.

The EPS system 128 includes an EPS motor and an electronic control unit for an EPS (EPS ECU), both of which are not illustrated. The steering angle sensor 144, the steering torque sensor 146, and the steering wheel 154 described above may be regarded as part of the EPS system 128.

The EPS ECU controls the EPS motor in response to commands from the traveling ECU 110 to control the steering angle θst of the vehicle 100.

The traveling ECU 110 includes, for example, a central processing unit (CPU) and performs automated drive control enabling the vehicle 100 to be driven to a target point without requiring driving operations by the driver. The traveling ECU 110 further includes an input/output section 170, a computing section 172, and a storage section 174.

The input/output section 170 inputs and outputs data to and from instruments other than the traveling ECU 110 (for example, the sensor groups 114, 116, and 118 and the communication device 120). The computing section 172 performs computations based on signals from, for example, the sensor groups 114, 116, and 118, the communication device 120, the HMI 122, and the ECUs. The computing section 172 then generates signals to be sent to the communication device 120 and the ECUs based on the computation results.

The computing section 172 of the traveling ECU 110 includes an environment identification part 180, an action planning part 182, and a travel control part 184. Programs stored in the storage section 174 are executed to realize the parts.

The environment identification part 180 recognizes road markings and surrounding obstacles (both not illustrated) based on the vehicle environment information from the vehicle environment sensor group 114. For example, the road markings are identified based on image information. The environment identification part 180 identifies the lane in which the vehicle 100 is traveling based on the identified road markings.

The action planning part 182 calculates a planned route of the vehicle 100 to the target point input via the HMI 122 and provides route guidance along the planned route.

The travel control part 184 controls outputs from actuators that control body behaviors. The actuators here include the engine, the brake mechanism, and the EPS motor. The travel control part 184 controls the outputs from the actuators to control a behavioral amount of the vehicle 100, in particular, of the body (body behavioral amount). The body behavioral amount here includes the vehicle speed V, the acceleration G, the steering angle $\theta$st, and the yaw rate Y.

The travel control part 184 includes a driving force controller, a braking force controller, and a turn controller (all not illustrated). The driving force controller controls the driving force of the vehicle 100 by mainly controlling the output from the engine. The braking force controller controls the braking force of the vehicle 100 by mainly controlling the output from the brake mechanism. The turn controller controls the steering angle $\theta$st of the vehicle 100 by mainly controlling the output from the EPS motor.

The storage section 174 stores programs and data (map database) used by the computing section 172. The map database stores road map information (map information).

The storage section 174 includes, for example, random-access memory (hereinafter referred to as "RAM"). Volatile memory such as registers and nonvolatile memory such as flash memory may be used as the RAM. The storage section 174 may include read-only memory (hereinafter referred to as "ROM") in addition to the RAM.

As illustrated in FIG. 5, the driving state detection section 102 of the second seat device 10B detects whether the vehicle is currently traveling in an automated drive mode or in a manual drive mode according to the operation on the automated drive SW 160. In this embodiment, the "driving state" includes the driver's act of getting in or out of the vehicle 100 in addition to the traveling state of the vehicle 100.

Moreover, the driving state detection section 102 detects, for example, the following first driving state.

(a) In the automated drive mode, the driving state detection section 102 detects that the vehicle is currently accelerating or decelerating based on, for example, the acceleration G output from the accelerometer 132.

(b) In the automated drive mode, the driving state detection section 102 detects that the vehicle is currently turning based on, for example, the torque Tst output from the steering torque sensor 146 and the steering angle $\theta$st output from the steering angle sensor 144.

(c) The driving state detection section 102 detects that the driver 72 is getting in or out of the vehicle 100 based on a signal output from the driver's door sensor 112.

In addition, the driving state detection section 102 detects, for example, the following second driving state.

(d) In the manual drive mode, the driving state detection section 102 detects that the vehicle is currently traveling at the vehicle speed V of 20 km/h or more based on the vehicle speed V output from the vehicle speed sensor 130.

(e) In the manual drive mode, the driving state detection section 102 detects that the driver 72 is pressing the accelerator (accelerating state) or applying the brake (braking state) based on the operational amount eap of the accelerator pedal 150 or the operational amount ebp of the brake pedal 152.

(f) In the manual drive mode, the driving state detection section 102 detects that the driver 72 is turning the steering wheel (turning state) based on the steering angle $\theta$st of the steering wheel 154.

(g) The driving state detection section 102 detects that the driver 72 is getting in or out of the vehicle 100 based on the signal from the driver's door sensor 112.

The control unit 68 of the second seat device 10B does not activate the reclining direction determination section 82 when the detection result obtained by the driving state detection section 102 corresponds to the first driving state in the automated drive mode or to the second driving state in the manual drive mode. That is, the seatback 52 will not be moved.

Next, a processing operation of the second seat device 10B will be described with reference to a flowchart in FIG. 7.

Figure 7:
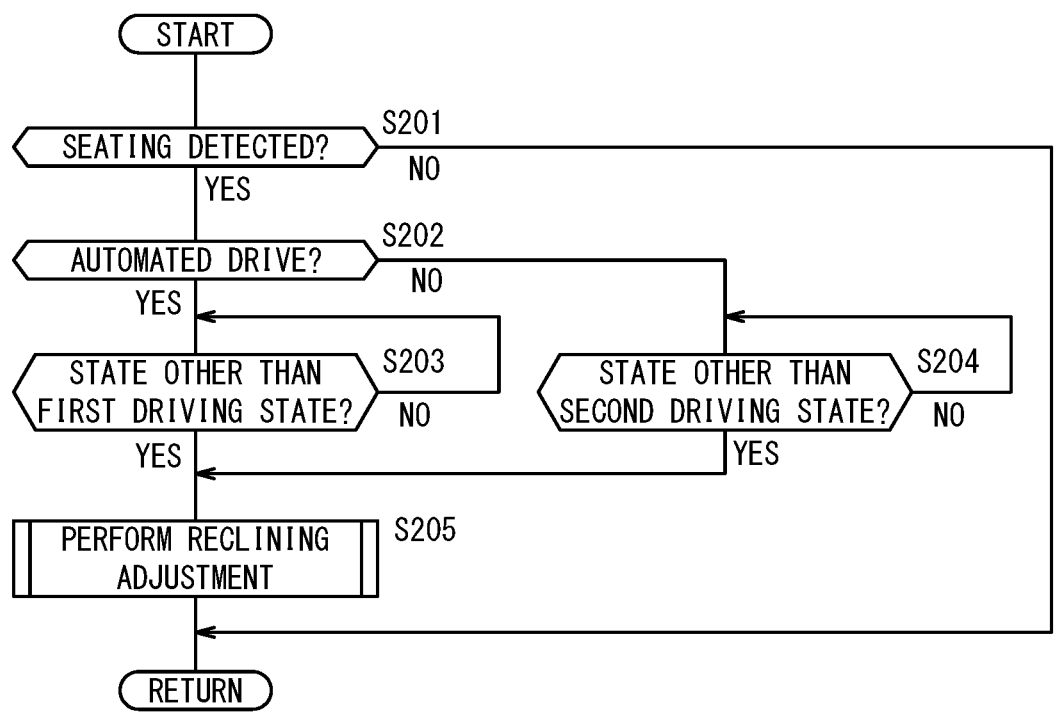
FIG. 7 is a flowchart illustrating an example processing operation of the second seat device.

First, in step S201 in FIG. 7, the seating determination section 80 detects whether the driver 72 is seated on the seat cushion 50. For the detection, it is determined whether the value Pt of the seating sensor 66 is greater than the predetermined seating threshold Ptha. If the value Pt of the seating sensor 66 is greater than the seating threshold Ptha, the seating determination section 80 detects that the driver 72 is seated (YES in step S201), and the process proceeds to step S202.

In step S202, the driving state detection section 102 detects whether the vehicle is currently traveling in the automated drive mode or in the manual drive mode according to the operation on the automated drive SW 160. If the vehicle is traveling in the automated drive mode (YES in step S202), the process proceeds to step S203, and the driving state detection section 102 determines whether the vehicle is currently in a driving state other than the first driving state, that is, whether the vehicle is in one of the above-described states (a) to (c). If the vehicle is in the first driving state (NO in step S203), the process waits until the driving state of the vehicle enters into a state other than the first driving state.

On the other hand, in step S202, if it is determined that the vehicle is traveling in the manual drive mode (NO in step S202), the process proceeds to step S204, and the driving state detection section 102 determines whether the vehicle is currently in a driving state other than the second driving state, that is, whether the vehicle is in one of the above-described states (d) to (g). If the vehicle is in the second driving state (NO in step S204), the process waits until the driving state of the vehicle enters into a state other than the second driving state.

Subsequently, when the driving state of the vehicle becomes a state other than the first driving state (YES in step S203) or other than the second driving state (YES in step S204), the process proceeds to step S205, and a process similar to the reclining adjustment of the first seat device 10A described above (see FIG. 3) is performed.

[Invention Resulted from Embodiments]

[1] The invention that is able to be understood from the above-described embodiments will be described below.

The seat device according to the embodiments, including at least the seat cushion 50 and the seatback 52, includes the first pressure sensor 64A attached to the seatback 52 to detect pressure, the second pressure sensor 64B attached to the seatback 52 at a position below the first pressure sensor 64A to detect pressure, and the control unit 68 configured to control the angle θ of the seatback 52 based on the value Pa of the first pressure sensor 64A and the value Pb of the second pressure sensor 64B.

This allows the driver 72 to intuitively and easily adjust the seat position by directly acting on the seatback 52, for example, pressing their back against or weakening the pressing without groping blindly or checking visually.

[2] In the embodiments, the control unit 68 controls the angle θ to recline the seatback 52 backward when the value Pa of the first pressure sensor 64A is greater than the value Pb of the second pressure sensor 64B.

When the driver 72 presses the back against the seatback 52, the value Pa of the first pressure sensor 64A becomes greater than the value Pb of the second pressure sensor 64B. This causes the seatback 52 to recline backward according to the intention of the driver 72.

[3] In the embodiments, the control unit 68 controls the angle θ to tilt the seatback 52 forward when the value Pa of the first pressure sensor 64A is less than the value Pb of the second pressure sensor 64B.

When the driver 72 moves in a direction away from the reclining seatback 52 that has leaned backwards, the value Pa of the first pressure sensor 64A becomes less than the value Pb of the second pressure sensor 64B since, for example, only the second pressure sensor 64B receives pressure. This causes the seatback 52 to rise forward according to the intention of the driver 72.

[4] In the embodiments, the control unit 68 stops the control of the angle θ when the difference ΔPab between the value Pa of the first pressure sensor 64A and the value Pb of the second pressure sensor 64B is in a predetermined range.

Stopping the control of the angle θ by the control unit 68 when the difference ΔPab between the value Pa of the first pressure sensor 64A and the value Pb of the second pressure sensor 64B is small and in the predetermined range prevents even a slight movement of the driver 72 from activating the seat position adjustment. That is, unexpected seat position adjustment (in a situation where adjustment of the seat position is not intended) can be avoided.

[5] In the embodiments, the seat device further includes the driving state detection section 102 configured to detect the driving state of the vehicle 100 in which the seat device is installed, and the control unit 68 stops the control of the angle θ of the seatback 52 based on the detection result obtained by the driving state detection section 102.

For example, in some cases, the driver 72 may press the back against the seatback 52 or the back of the driver 72 may be temporarily separated from the seatback 52 while the vehicle 100 is accelerating, decelerating, turning, or the like.

The same thing may occur when the driver 72 gets in or out of the vehicle 100. In such a case, the control unit 68 stops the control of the angle θ of the seatback 52. This enables the angle θ of the seatback 52 to be controlled only when the adjustment of the position of the seatback 52 is desired, providing a user-friendly seat device capable of increasing the commercial value of the vehicle 100 and the like.

[6] In the embodiments, the vehicle 100 has the manual drive mode in which the driver 72 operates the vehicle 100 and the automated drive mode in which the vehicle 100 operates autonomously. The control unit 68 uses different conditions for stopping the control of the angle θ of the seatback 52 in the manual drive mode and in the automated drive mode.

For example, in the automated drive mode, the condition for stopping the control of the angle θ of the seatback 52 is set based on temporal changes in the values output from the vehicle speed sensor 130, the accelerometer 132, the steering angle sensor 144, and the like. In the manual drive mode, the condition for stopping the control of the angle θ of the seatback 52 is set based on the values detected by the devices such as the accelerator, the brake, the steering wheel, and the like the driver 72 directly operates.

The control unit 68 uses different conditions for stopping the control of the angle θ of the seatback 52 depending on whether the current mode is the manual drive mode or the automated drive mode.

Thus, in the automated drive mode, since the driver 72 is not directly operating the devices, the driver 72 will not find out that the vehicle 100 accelerates, decelerates, turns, or the like until these operations are actually performed. Consequently, the adjustment of the seatback 52 could be performed while the above-described operations are being performed. Even in this case, the driver does not need to care about every operation such as acceleration, deceleration, turning, or the like of the vehicle 100 since the control of the angle θ of the seatback 52 is stopped while the above-described operations are performed.

By contrast, in the manual drive mode, the driver 72 can find out that the vehicle 100 will accelerate, decelerate, turn, or the like in advance since the driver 72 is directly operating the devices. The driver 72 can concentrate on a manual drive since the control of the angle θ of the seatback 52 is stopped while the above-described operations are performed.

In this manner, the different conditions for stopping the control the angle θ of the seatback 52 are used in the automated drive mode and in the manual drive mode, whereby the comfort of the driver 72 can be improved.

[7] In the embodiments, the seat device further includes a moving mechanism for the seat cushion 50 and the third pressure sensor 64C attached to the seat cushion 50 to detect the pressure. The control unit 68 controls at least the moving direction of the seat cushion 50 based on the value Pc of the third pressure sensor 64C.

When the driver 72 wishes to move the seat cushion 50 backward, the driver 72 usually tries to move the seat cushion 50 backward using the legs (mainly the backs of the thighs). By contrast, when the driver 72 wishes to move the seat cushion 50 forward, the driver 72 tries to do so using mainly the buttocks and the forefeet while raising the legs (mainly the backs of the thighs). This causes a difference between the value Pc detected by the third pressure sensor 64C when the seat cushion 50 is to be moved backward and the value Pc detected by the third pressure sensor 64C when the seat cushion 50 is to be moved forward.

Thus, by detecting the value Pc of the third pressure sensor 64C attached to the seat cushion 50, it is possible to objectively recognize in which direction the driver 72 wishes to move the seat cushion 50.

The seat cushion 50 can be moved according to the intention of the driver 72 by reflecting the above-described relationship in the control performed by the control unit 68, providing greater comfort of the driver 72.

The present invention is not limited to the above-described embodiments, and various modifications can be made freely without departing from the spirit and scope of the present invention as a matter of course.

Figure 8A:
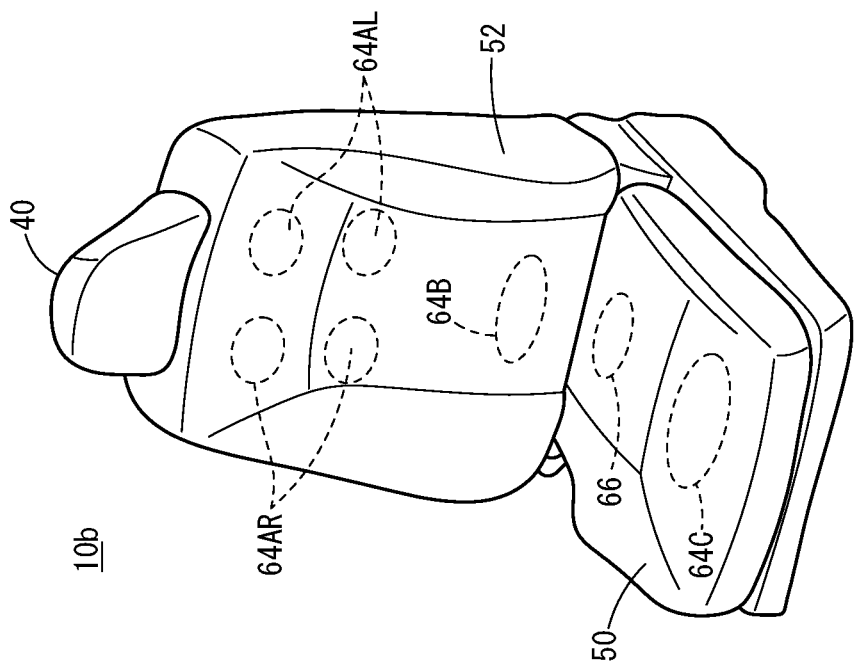
FIG. 8A is a perspective view illustrating the appearance of a seat device according to a first modification of the embodiments and an example arrangement of various pressure sensors.
Figure 8B:
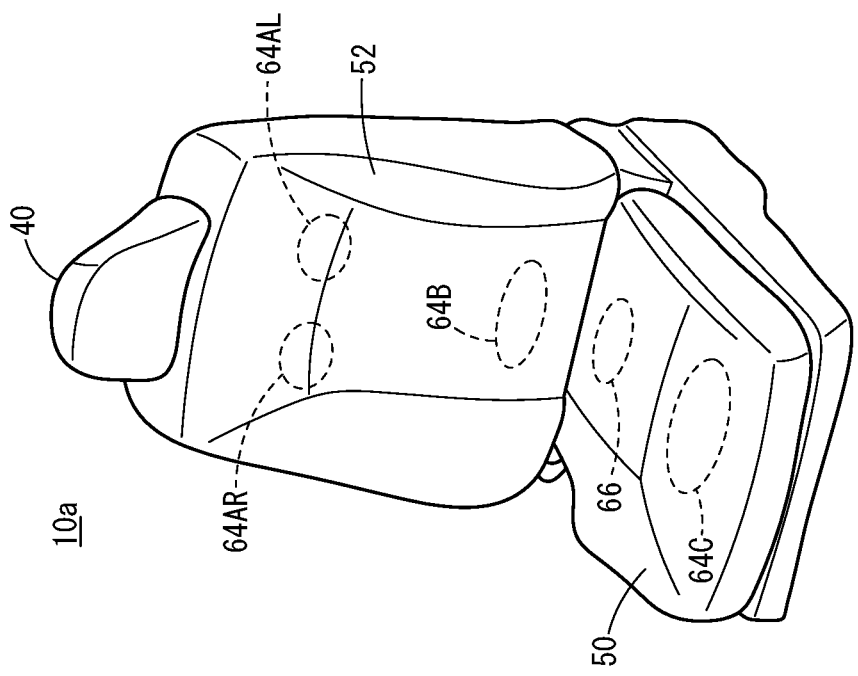
FIG. 8B is a perspective view illustrating the appearance of a seat device according to a second modification and an example arrangement of various pressure sensors.

For example, instead of including only one first pressure sensor 64A, the first seat device 10A and the second seat device 10B may include a plurality of first pressure sensors 64AL and 64AR as seat devices 10a and 10b do according to modifications respectively illustrated in FIGS. 8A and 8B. In this case, for example, the first pressure sensor 64AL and the first pressure sensor 64AR may be respectively disposed on the left and the right as illustrated in FIG. 8A, or the plurality of first pressure sensors 64AL and the plurality of first pressure sensors 64AR may be respectively disposed on the left and the right as illustrated in FIG. 8B.

In the seat device 10a illustrated in FIG. 8A, the reclining direction determination section 82 may be activated when the value of the first pressure sensor 64AL on the left and the value of the first pressure sensor 64AR on the right are approximately equal. An example of the "approximately equal" case is that the reclining direction determination section 82 is activated when a difference (absolute value) between the value of the first pressure sensor 64AL on the left and the value of the first pressure sensor 64AR on the right is less than or equal to a predetermined activation threshold. This also applies to the seat device 10b illustrated in FIG. 8B, and the reclining direction determination section 82 may be activated when a difference (absolute value) between the total value of the plurality of first pressure sensors 64AL on the left and the total value of the plurality of first pressure sensors 64AR on the right is less than or equal to a predetermined activation threshold.

Thus, the seat position is not adjusted when the driver 72 is seated in an unstable manner, and is easily adjusted such that the seatback 52 is tilted to the position the driver 72 prefers when the back of the driver 72 is in contact with the seatback 52 in a stable manner.

What is claimed is:

1. A seat device including at least a seat cushion and a seatback, comprising:
    a first pressure sensor, including a first left pressure sensor and a first right pressure sensor, attached to the seatback to detect pressure;
    a second pressure sensor attached to the seatback at a position below the first pressure sensor to detect pressure; and
    a processor that controls an angle of the seatback based on a value of the first left or right pressure sensor and a value of the second pressure sensor,
    wherein when a difference between a value of the first left pressure sensor and a value of the first right pressure sensor is less than or equal to a predetermined activation threshold, the processor is activated.

2. The seat device according to claim 1, wherein the processor controls the angle to recline the seatback backward when the value of the first left or right pressure sensor is greater than the value of the second pressure sensor.

3. The seat device according to claim 2, wherein the processor stops the control of the angle when a difference between the value of the first left or right pressure sensor and the value of the second pressure sensor is in a predetermined range.

4. The seat device according to claim 1, wherein the processor controls the angle to raise the seatback forward when the value of the first left or right pressure sensor is less than the value of the second pressure sensor.

5. The seat device according to claim 4, wherein the processor stops the control of the angle when a difference between the value of the first left or right pressure sensor and the value of the second pressure sensor is in a predetermined range.

6. The seat device according to claim 1,
    wherein the processor detects a driving state of a vehicle in which the seat device is installed; and
    wherein the processor stops the control of the angle of the seatback based on the driving state.

7. The seat device according to claim 6, wherein:
    the vehicle has a manual drive mode in which the driver operates the vehicle and an automated drive mode in which the vehicle travels autonomously; and
    the processor uses different conditions for stopping the control of the angle of the seatback in the manual drive mode and in the automated drive mode.

8. The seat device according to claim 1, further comprising:
    a drive motor to move the seat cushion; and
    a third pressure sensor attached to the seat cushion to detect pressure;
    wherein the processor controls at least a moving direction of the seat cushion based on a value of the third pressure sensor.

* * * * *